US008924948B2

(12) United States Patent
Farhat

(10) Patent No.: US 8,924,948 B2
(45) Date of Patent: Dec. 30, 2014

(54) METHOD AND SYSTEM FOR CONTEXT MODELING

(71) Applicant: James Farhat, Jacksonville, FL (US)

(72) Inventor: James Farhat, Jacksonville, FL (US)

(*) Notice: Subject to any disclaimer, the term of this patent is extended or adjusted under 35 U.S.C. 154(b) by 0 days.

(21) Appl. No.: 14/091,186

(22) Filed: Nov. 26, 2013

(65) Prior Publication Data

US 2014/0149187 A1     May 29, 2014

Related U.S. Application Data

(60) Provisional application No. 61/730,105, filed on Nov. 27, 2012.

(51) Int. Cl.
    *G06F 9/44*      (2006.01)
    *G06Q 10/06*      (2012.01)

(52) U.S. Cl.
    CPC .......... *G06Q 10/0637* (2013.01); *G06Q 10/067* (2013.01)
    USPC ........... 717/168; 717/169; 717/170; 717/171; 717/172; 717/173

(58) Field of Classification Search
    USPC ................................................. 717/168–178
    See application file for complete search history.

(56) References Cited

U.S. PATENT DOCUMENTS

| | | | |
|---|---|---|---|
| 6,343,265 B1 * | 1/2002 | Glebov et al. | 703/25 |
| 8,121,874 B1 | 2/2012 | Guheen et al. | |
| 2005/0015762 A1 * | 1/2005 | Steckler et al. | 717/176 |
| 2006/0095274 A1 * | 5/2006 | Phillips et al. | 705/1 |
| 2006/0230314 A1 | 10/2006 | Sanjar et al. | |
| 2008/0016186 A1 * | 1/2008 | Ball | 709/220 |
| 2008/0271012 A1 | 10/2008 | Eykholt | |
| 2009/0013301 A1 | 1/2009 | Ogilvie et al. | |
| 2010/0083287 A1 * | 4/2010 | Maximilien et al. | 719/328 |
| 2010/0306735 A1 * | 12/2010 | Hoff et al. | 717/109 |
| 2011/0265087 A1 | 10/2011 | Chen et al. | |
| 2011/0265164 A1 * | 10/2011 | Lucovsky et al. | 726/7 |
| 2012/0030650 A1 | 2/2012 | Ravindran et al. | |
| 2012/0291009 A1 * | 11/2012 | Khare et al. | 717/109 |

OTHER PUBLICATIONS

SSO ("Sandboxed solution overview: SharePoint Server 2010"). May 12, 2010.*

* cited by examiner

*Primary Examiner* — Chat Do
*Assistant Examiner* — Jae Jeon
(74) *Attorney, Agent, or Firm* — Stephen E. Kelly; Rogers Towers, P.A.

(57) ABSTRACT

A context modeler comprising a computer software graphical subsystem and a solution packaging service. The computer software graphical subsystem renders a graphical user interface, which is used to map different objects from the web application platform and set their properties, thereby creating a mapping file for use by the packaging service. The packaging service is used to automatically create a solution package file for deployment within the web application platform. The solution package file is created when the packaging service uses one or more methods to generate a set of instructions for implementing computer processor or server action, and this set of instructions is wrapped inside a solution package file recognized by the web application platform.

14 Claims, 7 Drawing Sheets

METHOD AND SYSTEM FOR CONTEXT MODELING

CROSS REFERENCES TO RELATED APPLICATIONS

This application makes reference to, claims priority to, and claims the benefit of U.S. provisional patent application Ser. No. 61/730,105, filed on Nov. 27, 2012, the entire contents of which are incorporated herein by this reference.

BACKGROUND OF THE INVENTION

The present invention relates generally to the field of automatically creating and implementing solutions for enterprise management systems, platforms, and packages ("EMS"). Microsoft SharePoint is one of the most common EMS platforms, although there are many others. EMS platforms generate solutions for implementation in the enterprise's processes or business. Many of these EMS platforms are implemented through cloud computing, and they have returned a great benefit to the enterprises using them. However, current solution techniques require installation of certain modules to create and implement the application solution. Examples of such modules include SharePoint Designer and SharePoint environment. In many cases, this process requires significant configuration effort, and implementation of these solutions also requires the user to navigate into the SharePoint environment to see the application hierarchy, the relationships, and right management. This "manual" process requires significant time an effort.

The present invention seeks to overcome these problems by providing a context modeler that creates an EMS solution application that allows the user to create and update EMS application deployable solutions for manual or automatic deployment in the EMS. The user can design a hierarchy of objects on a virtual canvas to generate the documentation and solution files for deployable solutions deployed either globally or in an isolated manner.

SUMMARY OF THE INVENTION

The context modeler generally comprises a computer software graphical subsystem ("CSGS") and a solution packaging service. The CSGS is capable of rendering graphical user interfaces in a variety of applications, and it is used to map different objects from the web application platform and set their properties, thereby creating a mapping file for use by the packaging service. The CSGS incorporates certain functionality, such generating a canvas drawing on a canvas element, setting properties of each object mapped, adding security groups, and adding metadata and columns.

The packaging service is used to automatically create a solution package file for the web application platform. Generally, the solution package file is created when the packaging service uses one or more methods to generate a set of instructions for implementing the server action, and this set of instructions is wrapped inside a solution package file recognized by the web application platform. This is discussed in more detail below.

The CSGS is used for rendering user interfaces by mapping different objects from user interface controls to the user interface. The CSGS is also used to set the properties of the objects being mapped. The CSGS uses the platform's canvas as a drag and drop destination for certain properties of the object. The resulting mapping file comprises object data, which is typically in markup language format. The mapping file is then sent to the solution packaging service for creation of the web application platform solution package.

The packaging service receives the mapping file from the CSGS and packages the markup language information into a packaged solution file that can contain distributed or constrained solutions, such as global solutions or isolated solutions (e.g. farm solutions or sandboxed solutions in Microsoft SharePoint). The packaging service also uses the mapping file to create word processing documentation, such as a Microsoft Word document, or the like. The word processing documentation is used by the enterprise as a solution statement, such as a work order, contract, project proposal, or the like.

DETAILED DESCRIPTION OF THE INVENTION

Figure 1:
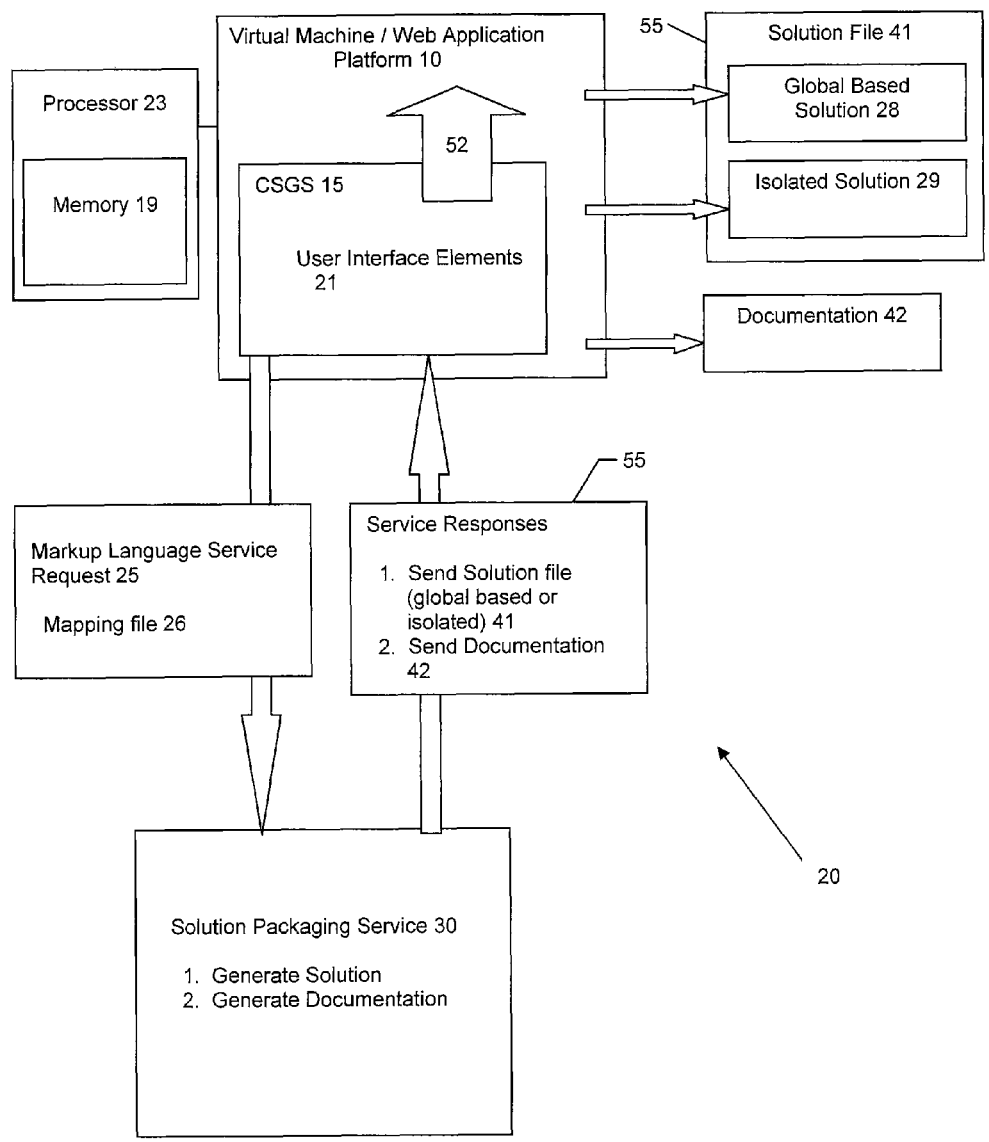
FIG. 1 is a diagram showing one embodiment of the content management system.

With reference to the drawings, the invention will now be described with regard for the best mode and the preferred embodiment. In general, the system is a context modeler for real-time creation and revision of web application solutions in a web application platform. The embodiments disclosed herein are meant for illustration and not limitation of the invention. An ordinary practitioner will understand that it is possible to create many variations of the following embodiments without undue experimentation.

The purpose of the context modeler taught herein is to automatically create a deployable solution for either manual or automatic deployment inside a web application platform. The context modeler 20 taught herein, also referred to as the context modeling system, interfaces with the web application platform 10. The platform 10 comprises one or more of a variety of features, such as capabilities to support multiple web technologies, cloud computing capabilities, intranet portals, document and file management capabilities, collaboration among users and objects, support of extranets, websites, social networks, EMS application software, and many other features known to an ordinary practitioner. The web application platform 10 is supported by a data processor 23 either on premises or in a cloud computing context.

One embodiment of the context modeling system 20 comprises at least one processor 23 in communication with at least one memory device 19. The processor 23 comprises one or more of a number of suitable computer processors capable of managing, processing, analyzing, storing, and retrieving the data within the context modeling system 20. One embodiment of the processor 23 is hardwired dedicated circuitry for performing the system context modeling system 20 functionality described herein, such as circuitry within a microprocessor, coprocessor, a controller, or various other hardwired circuitry. Alternately, the processor 23 is configured to execute computer readable code stored on the memory device, where the computer readable code contains instruction for executing the context modeling system 20 functionality described below. The processor 23 could be a combination of hardwired dedicated circuitry and executable instructions. The processor 23 could be embodied within a controller, embodied within a server, or embodied separately. The memory device 19 is operable to store computer readable program instructions designated for execution by the at least one processor 23. An example of the computer readable program instructions are the steps and functionality performed by the context modeling system 20 discussed below. The memory device 19 includes one or more of volatile or non-volatile memory components, several of which are known in the art. The memory device 19 is configured to store data, applications, modules, instructions or the like for enabling the context modeling system 20 to execute the functionality described below in the various embodiments. The processor 23 and the memory device 19 are configured to interface with the peripheral components of the system described below. For example, the computer software graphical subsystem ("CSGS") 15, the solution packaging service 30, and the other system components discussed below are configured for execution by the at least one processor 23 in communication with the at least one memory device 19.

The web application platform 10 is deployed in a software environment, such as a Common Language Runtime of the .NET framework or similar or equivalent environment. The Common Language Runtime of the .NET framework is a virtual machine that manages the execution of programs and provides a variety of services, such as security and management services. In most embodiments, the web application platform 10 will be an EMS package, several of such which are commercially available. Some of the more common of such platforms include, without limitation, Microsoft SharePoint, a variety of SalesForce packages, SAP Strategic Enterprise Management, and many others. Several examples in the following discussion are made in the context of Microsoft SharePoint, but the invention is not limited to this platform. Rather, SharePoint is a common web application platform 10 and serves to illustrate the novel features of the invention disclosed herein. An ordinary practitioner will appreciate that the novelty and features of the present context modeler 20 will apply equally to web application platforms 10 other than SharePoint and in environments and operating systems other than Microsoft Windows.

FIG. 1 shows an overview of the system within which the context modeler 20 operates, demonstrating the communication between a CSGS 15 and the packaging application. In one embodiment, the context modeler 20 generally comprises a CSGS 15 and a solution packaging service 30. The CSGS 15 is capable of rendering graphical user interfaces in Windows-based applications, and it is used to map different objects from the web application platform 10 and set their properties, thereby creating a mapping file 26 for use by the packaging service 30. The CSGS 15 renders user interfaces by mapping different objects from user interface controls, such as properties grid, toolbox, component libraries and other entity-defined objects, to the user interface. As used herein, the term "object" means a variable, function, data structure, a data structure combined with an associated routine, or a combination of attributes and behaviors that encapsulate an entity. The CSGS 15 is able to define, link, and manipulate a variety of user interface elements 21. A non-limiting list of such user interface elements 21 includes workflow elements, security elements, data structure elements, data definition elements, taxonomy elements, form elements, and look and feel elements. Other such elements could be business intelligence, schema, configuration elements or the like. The CSGS 15 incorporates certain functionality, such as generating a canvas drawing on a canvas element 27, setting properties of each object being mapped, adding security groups or elements, adding metadata and columns, or the like.

In typical embodiments, the web application platform 10 has a data assembly tool for assembling user input data or objects in the web application platform 10. For example, in many embodiments the web application platform 10 either has a canvas element 27 or is capable of interfacing with one. The CSGS 15 does not use the web application platform 10 for its operations. Instead, the CSGS 15 only uses the platform's canvas 27 as an assembly tool, such as the drag and drop destination for certain properties of the object, such as Websites 31, List & Libraries 32, and Content Types 33 of the object (See FIG. 2). The resulting mapping file 26 comprises object data, which is typically in markup language format. The mapping file 26 is then sent to the solution packaging service 30 for creation of the web application platform 10 solution package 55. As one non-limiting example, the CSGS 15 could be a windows presentation foundation ("WPF") mapping application. In this embodiment, and by way of example and not limitation, the mapping application CSGS 15 is developed using a WPF programming model, .NET 3.5, and Microsoft Developer Express, as an ordinary practitioner will understand.

The packaging service 30 is used to automatically create a deployable solution package 55 comprising either a solution package file 41 or documentation 42. Generally, the solution package file 41 contains a set of instructions executable by the at least one processor 23 in communication with the at least one memory device 23. The solution package file 41 is created when the packaging service 30 uses one or more methods to generate the set of instructions for implementing the data processor 23 action, and this set of instructions is wrapped inside a solution package file 41 recognized by the web application platform 10. The packaging service 30 receives the mapping file 26 from the CSGS 15 and packages the markup language information into a solution package file 41, as described in more detail below. The packaging service 30 also uses the mapping file 26 to create documentation 42, such as a Microsoft Word document, Microsoft Excel document, a PDF document, or the like. The documentation 42 is used by the enterprise as a solution statement, such as a work order, contract, project proposal, or the like.

Context Modeler Architecture

The context modeler 20 follows service oriented architecture. In one embodiment, the CSGS 15 and the packaging service 30 are completely separate tools. In another embodiment, these two tools are loosely coupled with each other. When these two tools are uncoupled, the CSGS 15 passes the markup language data to the packaging service 30 using any suitable communication application. As one non-limiting example, this application could be a Silverlight application or any other application that sends the same markup language data from the CSGS 15 to the packaging service 30. As another example, the packaging service 30 is hosted on the cloud computing platform in a manner in which it is capable of being hosted in any cloud or local environment. The relationship between these tools is the markup language request for either solution or documentation generation and the response in the form of either the solution package file 41 or the markup language documentation file 42.

The communication between the CSGS 15 and the packaging services 30 is any suitable medium of communication in this computing environment. In most embodiments, the communication medium should be able to implement a service oriented architecture, such as by loosely coupled services. For example, the communication medium could be a set of APIs typically used for building connected, service-oriented applications. Depending on the design of the system, web services could be used to deploy the applications. As another common example, Windows Communication Foundation could be used for building and implementing the connected, service oriented architecture.

Mapping Application Workflow

Figure 2:
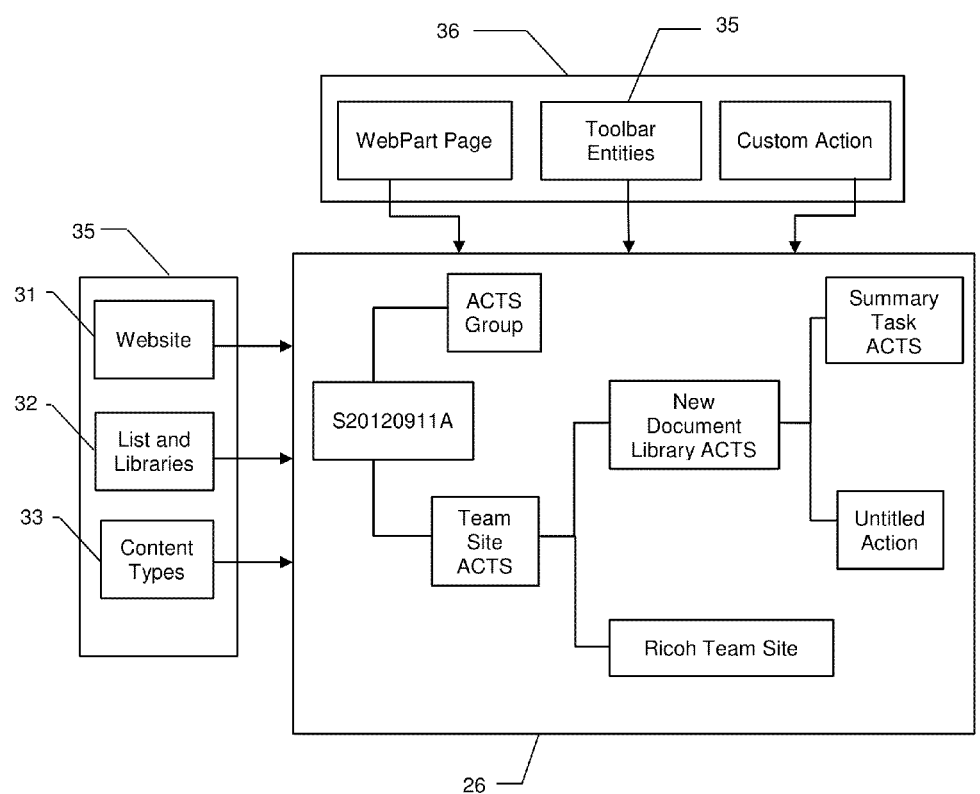
FIG. 2 is diagram showing the entities included in the computer software graphical subsystem, and the corresponding workflow.

FIG. 2 shows an exemplary list of entities involved in the CSGS 15. Entities shown under the Toolbar Entities 35 heading are the main entities, such as a website 31, the list and libraries 32, content types 33, and the like. This menu can be accessible via a context menu 36. The middle screen in FIG. 2 is the mapping canvas element 27, which allows a user to map and make relationship between allowed entities after a validation process. The validation process validates objects and properties to be defined as allowed or disallowed, depending on the validation criteria. This validation process exists as a framework throughout the mapping application. A user interface validation model on the canvas element 27 restricts the relationship between certain entities. That is, a defined parent-child relationship between objects is maintained through validation. This validation prevents the modeler from attempting an arrangement that is not possible to package in the solution package.

To create a mapping file 26, the user must capture objects to assemble and deliver them to assembly area. This capture and delivery process can be implemented in several known manners, such as by diagramming, drag and drop functions, leap motion and other motion sensing technology, and a variety of other means. For example, the user can drag and drop objects from a pre-populated library to the canvas element 27 and can add objects through a menu, list, context menu 36, or the like. Every object placed or drawn on the canvas 27 has multiple types of setting, such as add objects, general properties, and object settings. In this example, the add objects setting can be allowed to add allowed nested objects to the canvas 27 through a context menu 36. The general properties setting is used to establish properties of the object, such as the name, description, notes, and other types of properties as may be appropriate for different types of objects. The object settings are used to establish object parameters such as routing rules for the site and for the CSGS 15, columns or other indicia of organization, or retention policies or other types of parameters. These types of parameters are used for cataloguing the object in a document library, list, or other location.

By way of example and not limitation, in SharePoint the canvas element 27 also offers some operations through a context menu 36, some examples of such operations are:
1. Add To Library:
2. Edit Role Assignment:
3. Generate Documentation:
4. New:
   a. Content Type;
   b. Custom Action;
   c. Document Library;
   d. Form Library;
   e. List Instance;
   f. Web Part Page; or
   g. Website.

Other web application platforms may have different operations available through different menus or other avenues.

Context Modeler Application/Solution Properties

The context modeler 20 becomes activated inside the web application platform 10 so that the context modeler 20 deploys using a runtime file, such as a runtime .dll, the operations of which give instructions that the web application platform 10 activates and carries out within the runtime of the web application platform 10. This activation enables deployment of different configurations and operations that can be then provisioned or activated and used once the a certain feature has been activated. The steps are the following: (i) deploy the solution package 55; (ii) install the solution package 55 to the web application platform 10; and (iii) activate the solution 55 for deployment within the web application platform 10.

Generally, the solution package 55 is a file, an object, a set of objects, or the like. The properties for the software application solution created by the context modeler 20 contain general properties and settings. Non-limiting examples of the general properties in a typical web application platform 10 include logo, title, author, publisher, description, notes, and other such properties. The settings are present, for example, in a "Site Settings" menu of the web application platform 10 under the a subheading "Site Action" or some similar subheading, depending on the specific features of the web application platform 10. More generally, these settings should include security elements 37, routing rules 38, site theme 39, and managed metadata 40.

Figure 3:
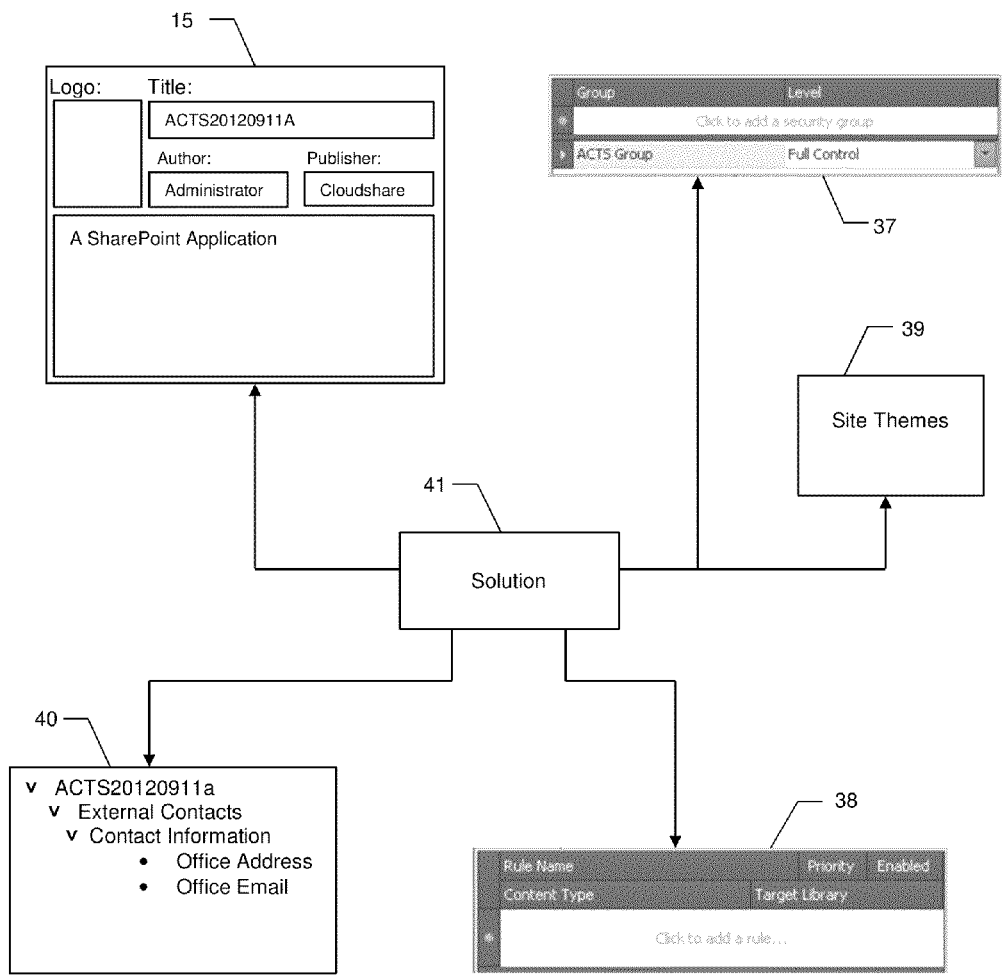
FIG. 3 is a diagram showing the properties for a SharePoint application/solution.

In reference to FIG. 3, the security groups setting allows the user to define as many user groups as desired. Using the security elements 37 setting, users are assigned into groups, each group having predetermined properties or parameters, such as level of access to the site, as an example. The access level contains predefined settings for different types of users, such as contributors, visitors, administrators, and other types of users. The access level settings defining concrete levels of access to the site for the users associated with the group. Alternately, a permissions setting can be added and used for authorization and authentication of users, entities, or clients. These settings are used to establish permission and roles of users and the like. Several methods of authentication and authorization are known in the art and can be deployed in a satisfactory manner in this context.

The routing rules 38 setting also matches with an actual web application platform 10 setting. Adding a new routing rule requires the name of the rule, its priority (if two or more rules are satisfying the criteria, the priority value will define which routing rule should run), a status of "enabled," a designation of content type, and a designation of the target library to which documents will be routed. The site theme 39 setting allows the user to choose from already defined themes. This setting can also add custom CSS or JavaScript for formatting custom features of the site. The managed metadata 40 setting allows the user to add terms and term set groups that will be used in content type or list columns in the context modeler 20.

List and Libraries Properties

Figure 4:
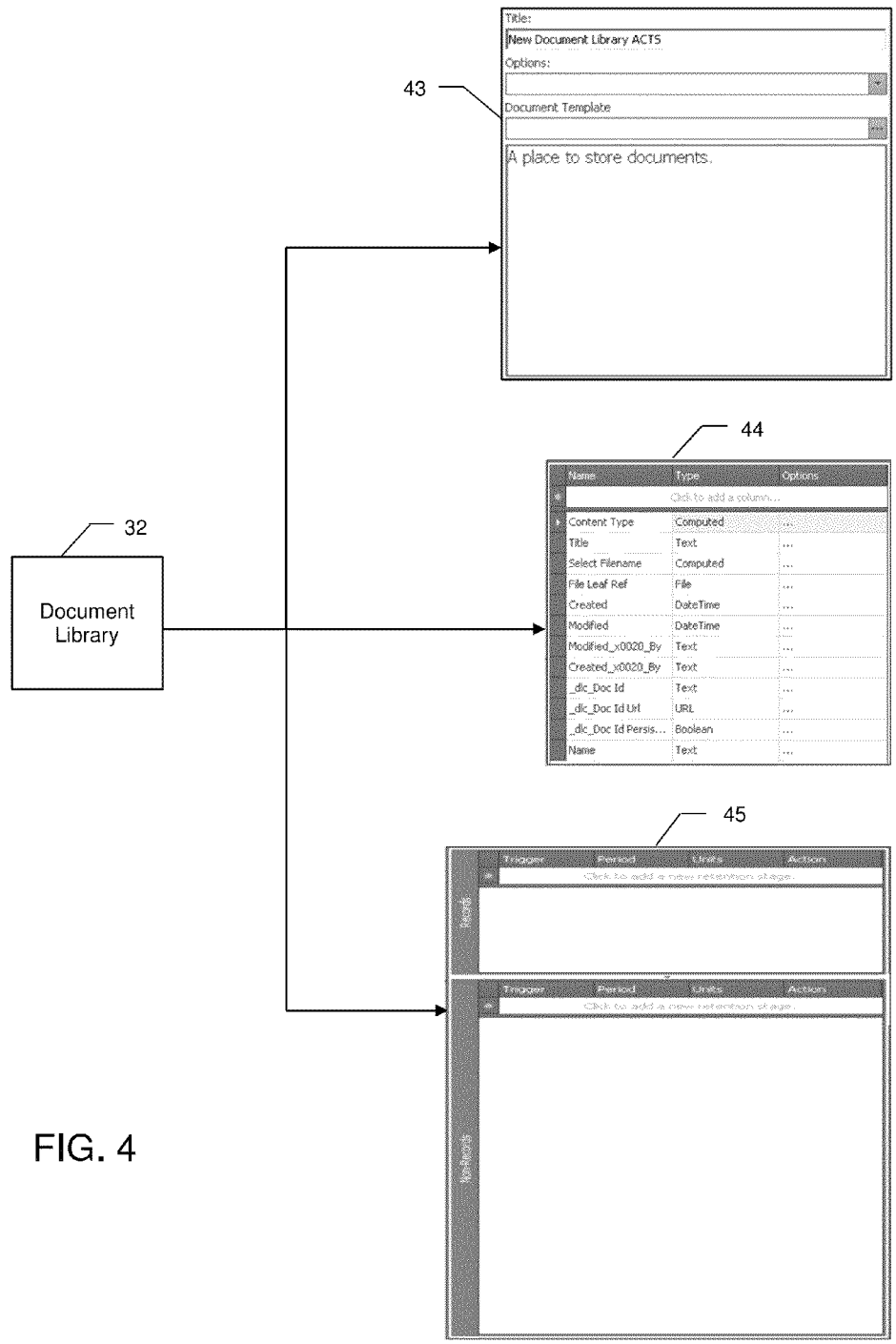
FIG. 4 is a diagram showing the lists and library properties for the computer software graphical subsystem.

Referring to FIG. 4, the document list and libraries 32 properties contain general properties and settings. The general properties include basic properties 43 such as title, options, document template, description, and notes. These settings are present in a "List Settings" menu of the web application platform 10, or some similar menu. The other settings are columns 44 and retention 45. A column is a description or representation of an attribute, such as a piece of metadata, that a user seeks to manage for any items in the list or content type to which the column is added. Retention 45 is a preset time period for content to be held in the web application platform 10 until a trigger requests that action be taken. These settings can be configured in the settings menu of the web application platform 10.

The optional columns setting allows the user to add columns for the selected list or library. Adding a new column requires column name and data type for the particular column. For example, the column names could be text, date, time, multiple choice, or the like. The retention setting allows the user to add a new retention policy by adding new rules. These rules are separated into record and non-record elements. Records elements are content (e.g. static documents) that has been declared a record. Records are content that is no longer active, will not be changed, and can be held for reference and retrieval. Records can be declared, after which these declared records are routed to the record center. The record center is typically a collection site in the web application platform 10 that is strictly utilized for records management. Once in records management, various rules and policies allow the records to be retained for a certain amount of years for use in other purposes. Non-Records are any content that is not a record. To customize the solution 55, the user can add specific rules by adding triggers (criteria), duration of retention, and action.

Content Type Properties

Figure 5:
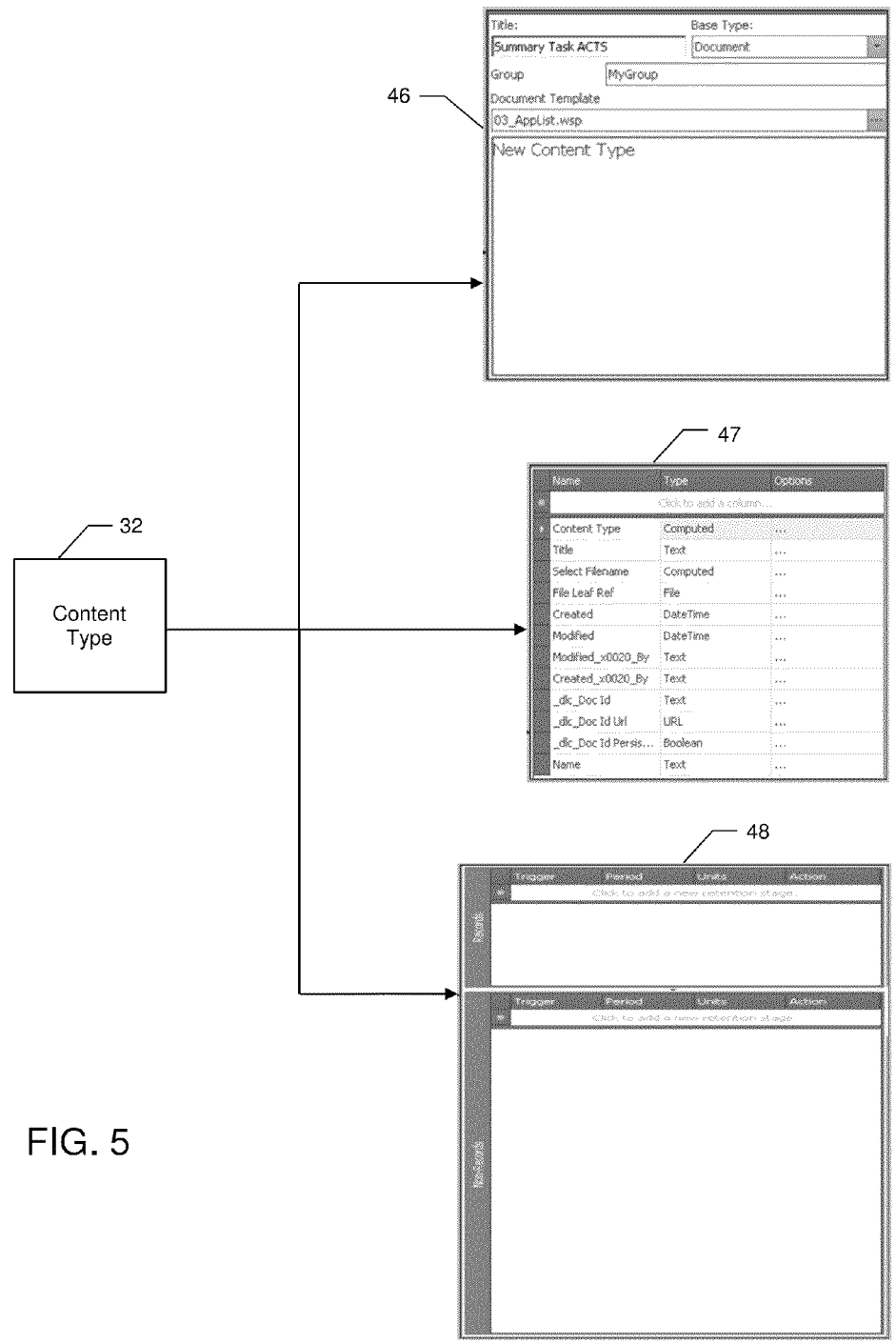
FIG. 5 is a diagram showing the content type properties for the computer software graphical subsystem.

Referring to FIG. 5, content type 32 properties contain basic properties 46 and settings. Non-limiting examples of the basic properties 46 include title, base type, group, document template, description, and notes. The settings, which include columns 47 and retention 48 settings, are present in a menu of the web application platform 10. As a non-limiting example, these settings could be under the "List Settings" menu of SharePoint. The optional columns 47 setting allows the user to add columns for the selected content type. For each column, adding a new column requires designating the column name and data type, such as text, date time, multiple choice or the like. Under the retention 48 setting, the user can add a new retention policy by adding new rules. These rules are separated in to record and non-record elements. The user can add rules by adding triggers (criteria), duration of retention and action.

Website Properties

Figure 6:
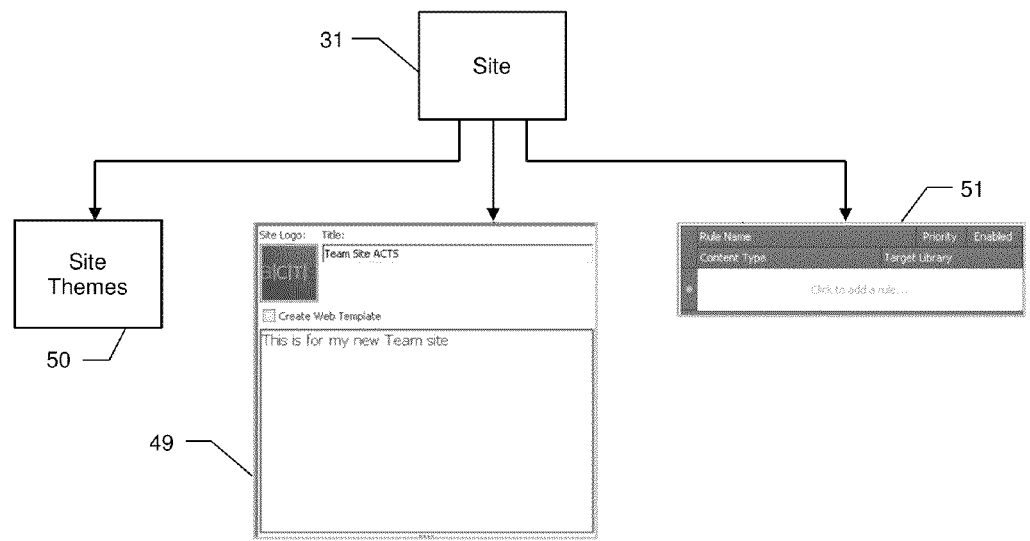
FIG. 6 is a diagram showing the site properties for the computer software graphical subsystem.

Referring to FIG. 6, the website 31 properties contain general properties and settings, which are present under a subheading of the web application platform 10. For example, these properties may be found under the "Site Action" subheading of the SharePoint "Site Settings" menu. Non-limiting examples of the general properties include basic properties 49 such as logo, title, author, publisher, description, notes, and the like. The settings include site themes 50 and routing rules 51. In most embodiments, the routing rules 51 setting matches with an actual setting in the web application platform 10. Adding a new routing rule 51 requires designating a name for the new rule, designating its priority (if two or more rules are satisfying the criteria, the priority value will define which routing rule should run), designating the rule as enabled, designating its content type (included in criteria), and designating a target library to which the documents will be routed. The site theme 50 setting allows the user to choose from already defined themes, or the user can add custom themes by using CSS or JavaScript files.

Solution Packaging Service

Generally, the solution packaging service 30 is a set of functions for interfacing with a software architecture for distributed systems, such as the world wide web (for example, the REST API interface), a client-side application for accessing a foundation server object model (for example, the SharePoint CSOM APIs), and other object models to assist in generating a resource data file, such as a runtime dynamic-link library .dll file. The solution packaging service 30 uses these functions to create the solution package 55 to be deployed by the web application platform 10, and the solution package 55 comprises a solution package file 41 wrapped around the resource data files 28, 29. The solution package file 41 is a .wsp file, an .opc file (using Open Packaging Conventions), or an equivalent file that is recognized by the web application platform 10 as a solution package file 41. The resource data files could be out-of-process or in-process binary files, such as .dll, .exe, .dmg, or the like. The resource data files contain instructions in a markup language, such as declarative XML or other equivalent, to instruct the web application platform 10 what to do to set structure, configure properties, make relationship between objects, dictate or break inheritance, and other similar functions. To create the solution package 55, the packaging service 30 inserts the resource data files 28, 29 into the solution package file 41.

The solution packaging service 30 is a cloud based service. In one embodiment, the solution packaging service 30 is based on a computing platform or framework, such as Windows Communication Framework, SharePoint Object Model, REST API, and other methods that allow for a runtime assembly to be built and inserted into a solution package file 41 such as a .wsp or .opc file. As one example, in the context of SharePoint, the solution package file 41 is a .wsp solution package file 41, which is generated by the packaging service 30 during SharePoint sessions of the context modeler 20.

As another example of the solution packaging service 30, the computing platform could be a cloud computing platform, which promotes the development and use of many different tools, languages, frameworks, and other features. One such cloud computing framework is Windows Azure, which is Microsoft's public cloud platform and frequently used to build multiple web applications that run and store information in designated Microsoft datacenters. In this particular example, which is not meant for limitation of the invention, the packaging service 30 is developed using the .NET framework and Microsoft SharePoint.

Figure 7:
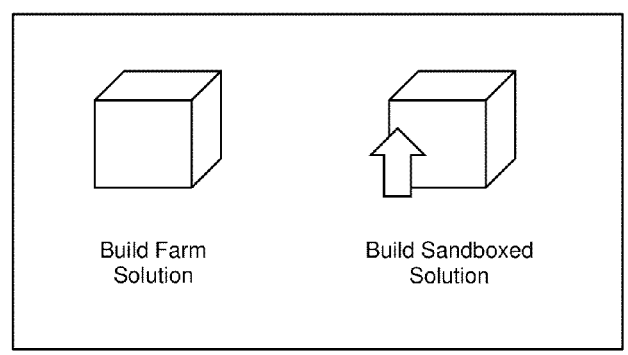
FIG. 7 is a diagram representing the packaged solution created by the solution packaging service.

The packaging service 30 processes the markup language request and performs two main functions: solution file generation, and documentation generation. During the function of solution file generation, the packaging service 30 parses the markup language file 26 and uses the context modeler 20 packaging service 30 tools to create the solution and package it in the format of the solution package file 41 corresponding to the web application platform 10. Referring to FIG. 7, these solution package files 41 are deployable, reusable packages that contain functionality such as features, site definitions, and other functions. These solutions files 41 can be a global based solution 28, or an isolated solution 29. A global based solution 28 is a solution that is deployed in a global manner throughout an entire system, such as throughout a variety of servers in a farm or cluster. By contrast, an isolated solution 29 is deployed in an isolated area within a system, such as across a portion of a server or across a limited number of servers within a system. Either of these solutions can be deployed in a centralized or distributed manner. As an example that an ordinary practitioner will understand, the global based solution 28 in SharePoint is a "farm solution," and the corresponding isolated solution 29 is a "sandboxed solution."

The packaging service 30 can leverage several methods to assist in interpreting the core programming languages and architectures needed to create the resource data files. For example, the packaging service 30 can use CAML.net, REST API, SharePoint CSOM, and other object models to assist in generating a runtime .dll file and the solution package 55 to be deployed by the web application platform 10.

Generally, global based solutions 28 created by the packaging service 30 are hosted in a web application process, such as Internet Information Services ("IIS") worker process, for example. This web application process executes code that can affect the whole server cluster in a distributed solution. In most instances, this EMS solution utilizes the full capabilities of the web application platform 10 during the customization process. By contrast, isolated solutions 29, or "sandboxed" solutions, do not run in the IIS worker process. Instead, isolated solutions 29 are hosted in the web application platform 10 user code solution worker process (such as a SPUCWorkerProcess.exe file), and these solutions run code that can only affect the site collection of the solution. Sandbox customizations have some restriction in using the capabilities of the web application platform 10.

The documentation generation function of the context modeler 20 is also driven by the markup language request to the packaging service 30. The same markup language file 26 sent for the solution file generation is used for the documentation generation function. The difference between the two functions is that for the solution file generation, the whole application markup language is sent to the packaging service 30 for conversion. By contrast, during documentation generation the CSGS 15 can send to the packaging service 30 the markup language of any object in the hierarchy, for example, site, document library, and content type, or the like. For creating a document, the packaging service 30 requires the markup language file 26 for the particular object (application, site, document library, or content type), and a word processing template. This template has a rich content area that is replaced by the data in markup language file 26 for a particular object. The user can demand documentation 42 of any object. The documentation generated will contain the documentation 42 of all the objects in the child hierarchy.

Solution Deployment

The solution package 55 can be deployed either manually or automatically. Once the packaging service 30 receives the mapping file 26 from the CSGS 15 and creates the solution package file 41 as described above, the packaging service 30 must deliver the solution 55 to the web application platform 10. This delivery can occur with or without further action or involvement by the context modeler 20. Regardless of whether the context modeler 20 is employed in solution delivery, the deployment of the solution in the web application platform 10 can occur manually or automatically.

For example, in one embodiment, shown in FIG. 1, the packaging service 30 returns the solution package file 41 to the CSGS 15. From there, the CSGS 15 can deploy 52 the solution 28, 29 in the web application platform 10 manually or automatically. For manual deployment 52, the user determines the time and manner in which the solution package 55 is deployed in the web application platform 10. Alternately, the CSGS 15 can be programmed to automatically deliver the solution 55 to the web application platform 10 for immediate deployment upon the CSGS's 15 receipt of the solution package file 41 from the packaging service 30.

Figure 8:
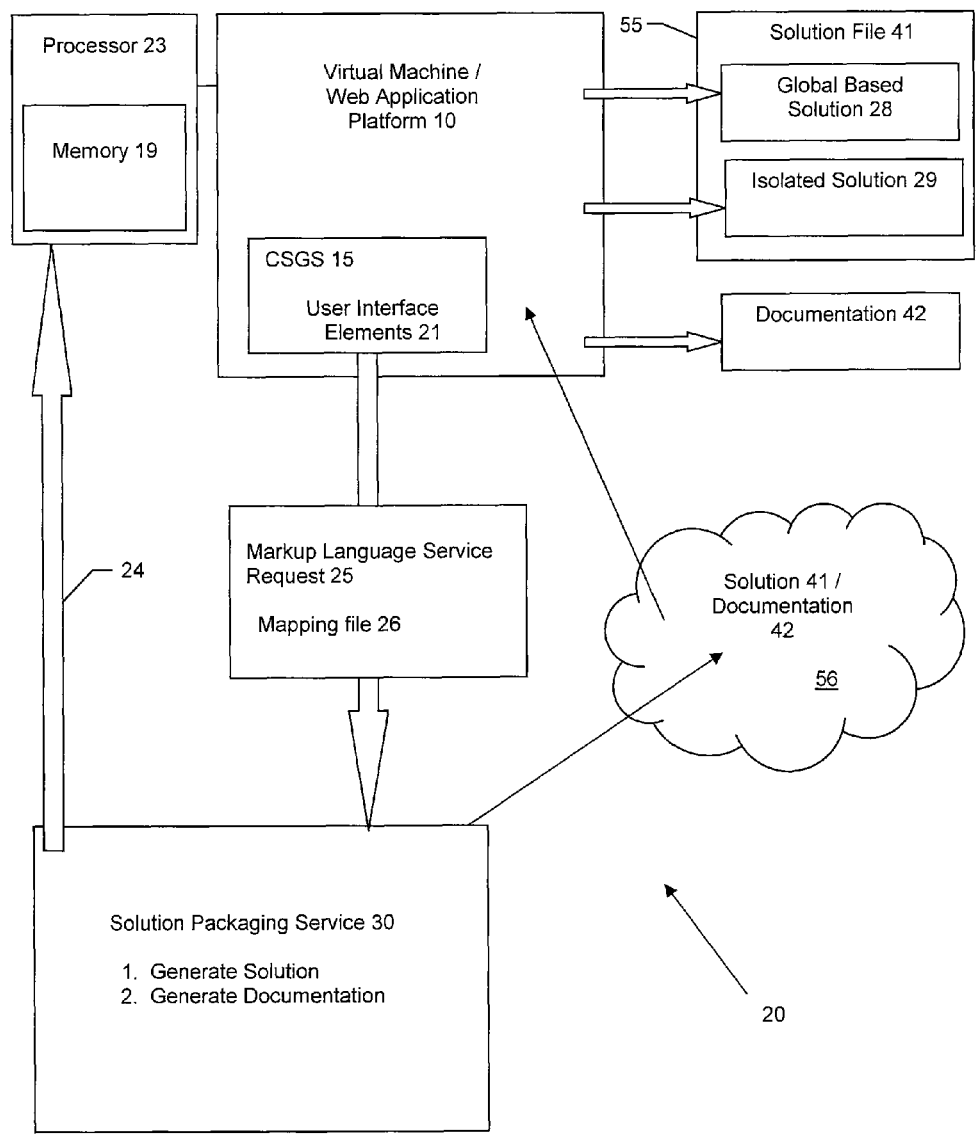
FIG. 8 is a diagram showing one embodiment of the content management system.

In another embodiment, the context modeler 20 bypasses the CSGS 15 during delivery of the packaged solution 55 to the web application platform 10. This embodiment uses an unpackaging service 56 to assist in solution deployment. The unpackaging service 56 can be either a cloud based on on-premises service. For example, in one embodiment, shown in FIG. 8, the packaging service 30 delivers the solution package 55, and therefore the solution package file 41, directly to a cloud based unpackaging service 56 rather than to the CSGS 15. The packaging service 30 then communicates with the web application platform 10 via its data processor 23, or server, or by some other means, to notify the web application platform 10 that the solution package file 41 is ready for retrieval from the cloud based unpackaging service 56. The web application platform 10 then automatically pulls the solution package file 41 from the unpackaging service 56 for automatic deployment in the web application platform 10 with no further involvement by the context modeler 20. Alternately, the web application platform 10 could retrieve the solution from the unpackaging service 56 for manual deployment in the web application platform 10.

Finally, in another embodiment, the unpackaging service 56 can be located inside the web application platform 10, such that the packaging service 30 delivers the solution package file 41 to the web application platform 56 where the built-in unpackaging service 56 is used to deploy the solution manually or automatically. This process by-passes the CSGS 15 and provides a direct deployment path for the packaged solution 55.

Future Enhancements

In addition to the loosely coupled structure, the context modeler 20 supports future enhancements. Due to the service oriented structure of the context modeler 20, the current tool sends markup language files to the services to perform certain actions. This application supports both feature enhancements and application enhancements. In the feature enhancements, the increasing addition of features only requires adding more nodes in the markup language files sent by the context modeler 20 application and parsing at the service end. Due to the markup language data structure sent to the service application, the feature enhancement is easily facilitated in this application.

In one embodiment of the context modeler 20, the CSGS 15 is a Windows Presentation Foundation based solution. This can be any model including Silverlight or Flash that can send the same markup language file, usually an XML file, that the current application is sending to the service application.

The foregoing embodiments are merely representative of the context modeler 20 and not meant for limitation of the invention. For example, one having ordinary skill in the art would understand that there are several embodiments and configurations of the context modeler 20 that may need adjustment depending on the web application platform 10 in which the modeler is deployed. Consequently, it is understood that equivalents and substitutions for certain elements and components set forth above are part of the invention described herein, and the true scope of the invention is set forth in the claims below.

I claim:

1. A context modeling system for automatically creating solution packages for deployment in enterprise management systems, said context modeling system comprising:
   at least one processor;
   at least one memory device;
   a context modeler configured for activation inside a web application platform, and further configured to deploy a runtime file that provides instructions to the web application platform, the context modeler comprising:
      a computer software graphical subsystem configured for execution by the at least one processor in communication with the at least one memory device, said computer software graphical subsystem interfacing with the web application platform, said web application platform in communication with the at least one processor and comprising an assembly tool, and said computer software graphical subsystem further interfacing with the assembly tool of the web application platform to create a mapping file containing object data corresponding to user input data; and a solution packaging service configured to receive the mapping file from the computer software graphical subsystem, package the corresponding object data into a resource data file containing functional instructions for the web application platform, and insert the resource data file into a solution package file, thereby creating a solution package deployable inside the web application platform;

wherein the solution packaging service automatically delivers the solution package to a deployment tool for deploying the solution package within the web application platform for use in the enterprise management system;

wherein the deployment tool is configured to receive the functional instructions in the resource data files and use either a client object model or web services to assist in generating a runtime file for deploying the functional instructions in the web application platform; and wherein the web application platform, upon receiving a notice from the solution packaging service, automatically retrieves the functional instructions for incremental deployment in the web application platform without deployment of the entire solution package file.

2. The context modeling system of claim 1, wherein the deployment tool is the computer software graphical subsystem adapted to manually deploy the solution package in the web application platform upon receiving a deployment command from a user.

3. The context modeling system of claim 2, wherein the computer software graphical subsystem is further adapted to unpackage the solution package and to incrementally deploy functional instructions in the web application platform without deployment of the entire solution package file.

4. The context modeling system of claim 1, wherein the deployment tool is the computer software graphical subsystem adapted to automatically deploy the solution package in the web application platform without receiving a deployment command from a user.

5. The context modeling system of claim 4, wherein the solution package comprises documentation for use by the web application platform as a solution statement.

6. The context modeling system of claim 1, wherein:
the deployment tool is a cloud-based unpackaging service;
the solution packaging service is further adapted to communicate with the web application platform to notify the web application platform that the solution package file is available for retrieval from the cloud-based unpackaging service; and
the web application platform, upon receiving the notice from the solution packaging service, automatically retrieves the solution package file from the unpackaging service for manual deployment of the solution package file in the web application platform upon receiving a deployment command from a user.

7. The context modeling system of claim 1, wherein:
the deployment tool is a cloud-based unpackaging service;
the solution packaging service is further adapted to communicate with the web application platform to notify the web application platform that the solution package file is available for retrieval from the cloud-based unpackaging service; and
the web application platform, upon receiving the notice from the solution packaging service, automatically retrieves the solution package file from the unpackaging service for automatic deployment of the solution package file in the web application platform without receiving a deployment command from a user.

8. The context modeling system of claim 7, wherein the solution package comprises documentation for use by the web application platform as a solution statement.

9. A method of automatically creating and delivering solution packages to an enterprise management system or platform, said method comprising the steps of:
activating a context modeler inside a web application platform, wherein the context modeler comprises a computer software graphical subsystem and a solution packaging service;
deploying a runtime file via the context modeler, wherein the runtime file provides instructions to the web application platform;
receiving user input data via the computer software graphical subsystem;
using the computer software graphical subsystem to convert said user input data into a mapping file comprising object data;
delivering said mapping file to the solution packaging service;
using the solution packaging service to create a solution package by converting the mapping file into a resource data file containing functional instructions for the web application platform and inserting the resource data file into a solution package file containing a set of instructions executable by at least one processor in communication with at least one memory device, wherein the at least one processor is configured for communication with a web application platform;
delivering the solution package to a deployment tool for deploying the solution package within the web application platform by:
deploying the solution package;
installing the solution package in the web application platform; and
activating the solution package for deployment with the web application platform for use in an enterprise management system; and
deploying the functional instructions in the web application platform by:
delivering the functional instructions in the resource data files to the deployment tool;
using either a client object model or web services to assist in generating a runtime file for deploying the functional instructions in the web application platform; and
upon receiving a notice from the solution packaging service, automatically retrieving the functional instructions for incremental deployment in the web application platform without deployment of the entire solution package file.

10. The method of claim 9, additionally comprising the steps of:
delivering the solution package to the computer software graphical subsystem functioning as the deployment tool;
retaining the solution package within the computer software graphical subsystem for manual deployment within the web application platform;
receiving via the computer software graphical subsystem a user command to manually deploy the solution package; and
using the computer software graphical subsystem to manually deploy the solution package in the web application platform after receiving the user command to manually deploy the solution package.

11. The method of claim 9, additionally comprising the steps of:
delivering the solution package to the computer software graphical subsystem functioning as the deployment tool; and
using the computer software graphical subsystem to automatically deploy the solution package in the web application platform without receiving a deployment command from a user.

12. The method of claim 9, additionally comprising the steps of:
delivering the solution package to a cloud-based unpackaging service functioning as the deployment tool;
retaining the solution package within the unpackaging service for manual deployment within the web application platform;
using the solution packaging service to notify the web application platform that the solution package file is available for retrieval from the cloud-based unpackaging service; and
retrieving the solution package file from the unpackaging service to the web application platform for manual deployment of the solution package file in the web application platform upon receiving a deployment command from a user.

13. The method of claim 9, additionally comprising the steps of:
delivering the solution package to a cloud-based unpackaging service functioning as the deployment tool;
retaining the solution package within the unpackaging service for automatic deployment within the web application platform;
using the solution packaging service to automatically notify the web application platform that the solution package file is available for retrieval from the cloud-based unpackaging service; and
automatically retrieving the solution package file from the unpackaging service to the web application platform for automatic deployment of the solution package file in the web application platform without receiving a deployment command from a user.

14. The method of claim 9, additionally comprising the steps of:
delivering the functional instructions in the resource data files to a cloud-based interpreter functioning as the deployment tool.

* * * * *